Aug. 1, 1950     F. R. HENSEL ET AL     2,517,430
METHOD OF MAKING BEARINGS
Filed Dec. 11, 1945
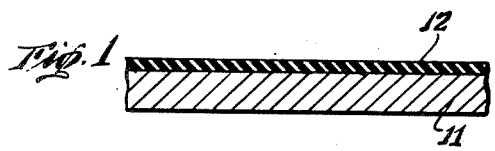
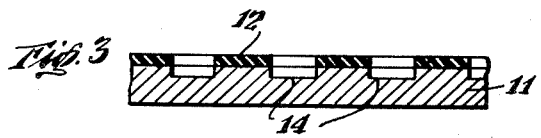
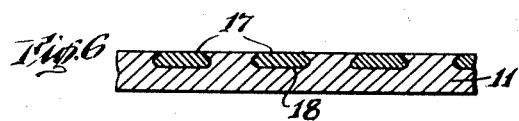
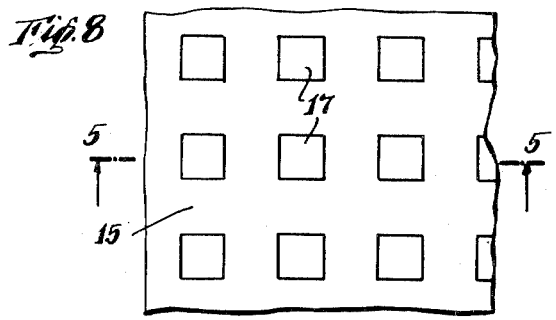
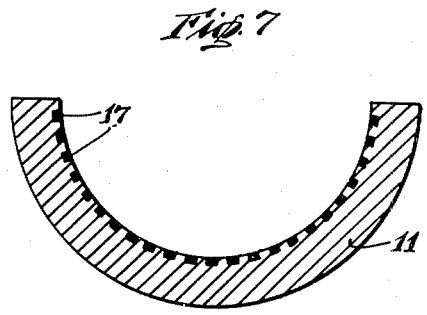
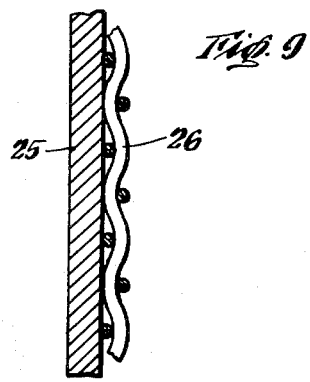
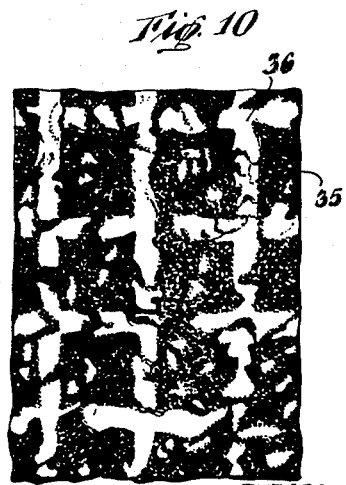
INVENTORS
Franz R. Hensel
Julian G. Sparkes
BY Chester F. Carlson
ATTORNEY Patented Aug. 1, 1950

2,517,430

UNITED STATES PATENT OFFICE 2,517,430

METHOD OF MAKING BEARINGS

Franz R. Hensel and Julian G. Sparkes, Indianapolis, Ind., assignors to P. R. Mallory & Co., Inc., Indianapolis, Ind., a corporation of Delaware Application December 11, 1945, Serial No. 634,264

2 Claims. (Cl. 41—43)

1

This invention relates to bearings and the manufacture thereof.

An object of the invention is to improve bearings and the methods of making them.

Other objects will be apparent from the following description and the claims.

In the drawing:

Figures 1 to 5 illustrate successive steps of one embodiment of the method of the invention, in which a bearing strip has been etched in accordance with the present invention;

Figure 6 is a cross section of a bearing strip embodying another form of this invention;

Figure 7 is a cross-sectional view of a bearing half-shell, the inside surface of which has been etched in accordance with the present invention;

Figure 8 is an enlarged top view of a bearing surface formed in accordance with the present invention;

Figure 9 is an enlarged sectional view of a bearing surface and cooperating elements adapted to produce the improved bearing according to one etching method of the present invention; and Figure 10 is a magnified view of the etched working surface of the bearing representing one form of the present invention.

The present invention contemplates an improved composite bearing having an etched grid surface and antifriction material filling the interspaces of the etched recesses.

The invention also contemplates simple and efficient methods of making such bearings by the etching of predetermined grid patterns and subsequently filling the recesses of the etched areas with suitable antifriction material.

The advantage of the selective grid etching of the present invention lies in retaining part of the bearing material proper in the form of a grid pattern to function as part of the bearing surface while the recesses of the etched areas are filled with antifriction materials such as lead, tin, babbitt and oils. Bearing materials are selected from alloys having high strength, high thermal conductivity and good frictional properties. Hence, the properties of both the bearing material and the antifriction material are combined to produce the optimum bearing conditions that may be specified.

Grid recesses formed in the bearing surface by mechanical means invariably have tapered sidewalls. When such recesses are filled with antifriction material and the bearing surface machined to size, the ratio between surface areas of the bearing material proper and the antifriction material changes. Thus, the achievement of a

2 definite desired ratio is difficult and unpredictable.

The advantage of the present invention lies in the chemical means of producing straight sidewalls in the recesses which when filled with antifriction material present a constant surface area even after machining to almost the full depth of the recess. The walls of the etched recesses are substantially at right angles to the surface of the bearing. The ratio of the areas of bearing material and antifriction material on the surface of the bearing will remain constant.

According to one embodiment of the invention as shown in Figure 1, the surface of the bearing 11 is first coated with a suitable masking composition 12 which is resistant to etching solutions. The desired grid pattern is cut through the coating as shown in Figure 2 leaving exposed portions 13 of the bearing surface. The bearing or the plate is then introduced into an etching bath wherein the exposed portions of the plate are selectively etched to the desired depth 14 as shown in Figure 3. Thereafter the coating is removed by suitable means leaving a bearing as shown in Figure 4 with a surface having etched areas 14 capable of being filled with antifriction materials, said etched areas being surrounded by unetched areas 15. Figure 5 shows antifriction material 17 filling the etched areas.

As shown in Figure 6, the etched recesses 18 may undercut the bearing surface so that there is a gripping action upon the antifriction material 17.

Figure 7 shows a bearing half-shell which has been treated in accordance with the procedure outlined as for Figures 1 to 5 inclusive. Figure 8 is an enlarged plan view of a bearing surface having a grid structure with etched areas filled with antifriction material 17 surrounded by unetched areas 15.

In Figures 1 to 7 the bearing material 11 may comprise the whole bearing or it may form a liner which is bonded to a backing of a high-strength material such as steel.

Variations in the relative areas of the etched and unetched portions of the bearing surface may be obtained either by changing the size of the cut-out pattern of the masking or by reversing the pattern.

One method of providing a masking for the bearing surface is to dip it at room temperature in a lacquer which is resistant to the etching solution. A lacquer coating of .002" to .003" thickness is suitable and it may be dried in air. The coating is then partially removed by cutting the desired grid pattern through the layer of coating by means of a suitable tool or die. Another method of applying the masking is to apply to the bearing surface a stencil already cut in the form of the desired grid pattern and then spraying, brushing or dipping in the lacquer and drying. The stencil sheet is then removed leaving the partially masked surface ready for etching. A lacquer suitable for masking may consist of Red Stop-off lacquer—D-2530—Wyandotte. Solvents for this lacquer may consist of amyl acetate, ethyl alcohol, X-1569 Wyandotte solvent stripper.

The masking material may also consist of a fusible composition which can be removed from the bearing by melting or peeling off after etching. Such masking compositions may consist of beeswax mixed with ozokerite, or of vinyl chloride dipping compounds. It is also possible to use a masking tape in which a fine pattern has been cut or punched. A masking layer may also be formed of nylon or some other fibrous fabric.

Still another method of forming grid patterns with areas resistant to etching solutions comprises a procedure somewhat similar to that practiced in making etched halftone plates. In carrying out this method a light-hardenable coating such as a chromated fish glue is applied to the bearing plate and predetermined areas thereof are exposed to light through a screen corresponding negatively in pattern to the grid to be formed. The exposed areas are thus light-hardened and are made insoluble in water while the soluble unexposed portions are removed by washing. The bearing with the grid coating material thereon is treated to insure adherence of the coating. After etching the bearing is subjected to a cathodic treatment in Royalite or other cleaner at a current density of 50 to 100 amperes per square foot. This treatment dissolves the light-hardened masking which can be readily washed away by rinsing in cold tap water, leaving a clean uncontaminated etched grid pattern on the face of the bearing.

A grid masking resistant to etching solutions may be printed on the bearing surface with a suitable stamp or roller.

Etching the bearing surface selectively in the form of a grid pattern may also be accomplished as illustrated in Figure 9 by covering the surface of the bearing 25 with a fine metal screen 26 having 100 or 150 meshes to the linear inch. The metal forming the screen is so chosen as to promote galvanic etching of the bearing surface when both are placed in the etching solution. The screen should be electropositive in relation to the bearing.

The following types of screens may be used for the various bearing materials:

| Bearing Material | Screen |
| --- | --- |
| Copper base | Silver, Gold or Platinum. |
| Silver base | Gold or Platinum. |
| Zinc base | Copper or Silver. |
| Cadmium base | Do. |
| Iron, Cobalt or Nickel base | Silver or Copper. |
| Aluminum base | Copper or Silver. |

The bearing produced by the "screen-etching" method will have a characteristic fretted or "waffle" appearance as shown in Figure 10 where etched areas 35 are interlaced with unetched areas 36 in a pattern corresponding to the weave of the screen. Figure 10 is a highly magnified view.

A preferred form of the invention employs a bearing comprising a matrix of copper and the alpha alloys of copper such as the brasses, bronzes, the aluminum bronzes and the like containing age-hardening ingredients precipitated as a dispersed phase in the cuprous base. The preferred age-hardening ingredients are intermetallic compounds such as the silicides, phosphides and beryllides of nickel, cobalt, iron, manganese and chromium. These age-hardening ingredients will readily diffuse into the copper base at elevated temperatures and upon subsequent heat treatment may be precipitated as a dispersed phase in the form of intermetallic compounds which contribute strength, high thermal conductivity, hardness and wear resistance to the copper or the alpha alloy of copper. The intermetallic compound-forming elements are added in the proportions in which they are capable of age-hardening the cuprous base and while, in some cases, an excess of these materials may be present without deleterious effect, it is ordinarily only necessary to add from a fraction of a percent to a few percent of the elements mentioned and of silicon, phorphorus or beryllium.

Several typical compositions follow:

1. Copper base containing 1 to 10% $Ni_2Si$ or $Co_2Si$.
2. Copper base containing 2.4% nickel and .6% silicon.
3. Copper base containing 1.2% nickel (or cobalt) and .3% phosphorus.
4. Copper base containing 1.5 to 2% nickel (or cobalt) and .5% beryllium.
5. Copper containing chromium.

These copper alloys are fused and then hot rolled onto a steel backing and quenched from 900° C. to 1000° C. after which they are cold rolled and age-hardened at 300° C. to 500° C. Thereafter the copper alloy is grid etched and formed into a bearing. The advantages of age-hardened copper alloys over ordinary tin bronzes are high thermal conductivity and higher strength. The dispersed phase in the copper provides excellent antifriction properties.

Age hardening silver alloys may also be used for etched grid bearings. Suitable bearing materials are formed of sterling silver containing 7.5% copper or coin silver containing 10% copper. These silver alloys are quenched from 750° C. and aged at about 275° C. for 2 hours.

Duraluminum type alloys which, after suitable heat treatment, exhibit high strength and wear resistance characteristics may be employed advantageously as bearings or bearing liners with the bearing surfaces etched in accordance with the present invention. The grid-etching method may also be applied to zinc, cadmium, iron, nickel and cobalt base alloys.

Typical etching solutions and procedures for each of the various bearing metals are listed as follows:

For copper:
  1. Anodic electrolytic
    Sodium cyanide—12 ounces per gallon
    Sodium hydroxide—2 ounces per gallon
    Water to one gallon
  2. Ferric chloride ($FeCl_3$)—4 pounds
    Hydrochloric acid—⅕ gallon
    Water—1 gallon
  3. Chromic acid—200 to 250 grams per liter
    Sulfuric acid to make $Cr_2O_3:H_2SO_4=100:1$
    Current density—7 to 14 amperes per square decimeter 6 to 12 volts
    A. C. current—50 to 60 cycles per second For silver:
1. Same as for copper #1 above, anodic electrolytic
2. Sulfuric acid—19 parts by volume
   Nitric acid—1 part by volume
3. Sodium cyanide—20 ounces per gallon For zinc:
1. Same as for copper #1 above, anodic electrolytic
2. Hydrochloric acid—15 ounces
   Water to 1 gallon
3. 5% nitric acid For cadmium:
1. Same as for copper #1 above, anodic electrolytic
2. Sodium nitrate—1 pound
   Water—1 gallon
3. Hydrochloric acid—1 gallon
   Water—½ pint For nickel and cobalt:
1. Sulfuric acid—2 gallons
   Glycerine—2 ounces
   Water—1 quart
   Anodic at 6 volts
2. Hydrochloric acid—2 ounces
   Water—1 gallon
   Anodic treatment
3. Fuming nitric acid
4. Sodium nitrate—4 to 5 pounds per gallon
   Anodic—6 volts
   Temperature—200° F.

For iron:
1. Hydrochloric acid—1:1
2. Sulfuric acid—25% by volume

For aluminum:
1. Oxalic acid—30 grams per liter
   Alternating current—10 to 50 volts
   Followed by treatment with sodium cyanide, 60 grams per liter
2. Hydrochloric acid—10 to 50% by volume
3. Sodium hydroxide—12 to 25%

After the bearing surface has been etched and cleaned the minute interspaces of the etched areas are filled with antifriction material. For example, the etched areas may be impregnated with one of the lower melting point and softer metals by immersing the bearing in a bath of the molten soft metal for a sufficient period of time. Such antifriction material may comprise lead, zinc, cadmium, tin, thallium or babbitt. Otherwise the reticular etched areas may be impregnated with an organic lubricant such as lubricating oils and greases and other lubricating compounds.

While specific embodiments of the invention have been described, it is intended to cover the invention broadly within the spirit and scope of the appended claims.

What is claimed is:

1. The method of making grid bearings which comprises providing a self-sustaining masking layer of a material resistant to a chemical etching agent and having a large number of apertures therein, placing said layer in direct contact with the surface of a bearing metal to expose isolated areas thereof and to mask the remaining areas thereof, etching the structure thus formed with a chemical agent to etch recesses in the said exposed areas, removing the masking layer, and filling the said recesses with a lubricating metal.

2. The method of making grid bearings which comprises placing against the surface of a bearing metal a self-sustaining screen of a metal that is electropositive with respect to the bearing metal to have said screen in direct contact with said surface and to define thereon generally isolated non-contacted areas surrounded by contacted areas, treating the structure thus formed with a chemical etching agent to etch recesses in the said uncontacted areas, removing the screen, and filling the said recesses with antifriction metal thereby to produce a grid bearing wherein islands of lubricating metal are separated from each other by a grid of bearing metal.

FRANZ R. HENSEL.
JULIAN G. SPARKES.

REFERENCES CITED

The following references are of record in the file of this patent:

UNITED STATES PATENTS

| Number | Name | Date |
|---|---|---|
| 1,581,394 | Dann | Apr. 20, 1926 |
| 1,637,317 | Shoemaker | July 26, 1927 |
| 2,052,962 | Booe | Sept. 1, 1936 |
| 2,166,366 | Norris | July 18, 1939 |
| 2,329,483 | Queneau | Sept. 14, 1943 |
| 2,341,293 | Rives | Feb. 8, 1944 |

FOREIGN PATENTS

| Number | Country | Date |
|---|---|---|
| 536,414 | Great Britain | May 14, 1941 |
| 547,619 | Great Britain | Sept. 3, 1942 |